H. G. OSBURN.
INDICATING DEVICE.
APPLICATION FILED AUG. 9, 1906.

955,988.

Patented Apr. 26, 1910.

UNITED STATES PATENT OFFICE.

HARRY G. OSBURN, OF HOBOKEN, NEW JERSEY.

INDICATING DEVICE.

955,988.

Specification of Letters Patent.  Patented Apr. 26, 1910.

Application filed August 9, 1906. Serial No. 329,903.

*To all whom it may concern:*

Be it known that I, HARRY G. OSBURN, a citizen of the United States, residing at Hoboken, in the county of Hudson and State of New Jersey, have invented new and useful Improvements in Indicating Devices, of which the following is a full, clear, concise, and exact description, reference being had to the accompanying drawing, forming a part of this specification.

My invention relates to improvements in indicating devices.

The objects of the invention are: first, to provide means for ascertaining at a distance and at any instant, the force transmitted by a driving member. Second, the provision of means whereby the speed of the driving member may be ascertained at any time, at any distance from the location of the driving member.

Still another object of my invention is to provide means for indicating at a distance and at any instant, the product of the force transmitted into the speed of transmission, to thereby ascertain the power transmitted by a driving member.

Further objects and advantages of the invention will appear in the following description taken in connection with the accompanying drawing, and the novel features thereof will be particularly pointed out in the appended claims.

Figure 1:
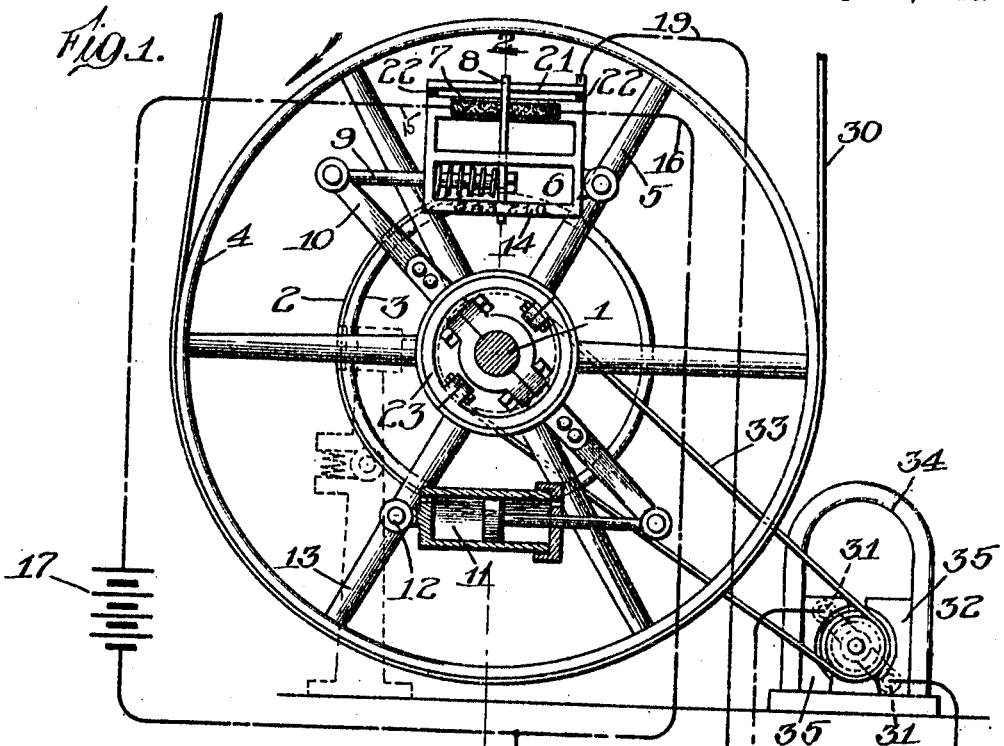
Figure 2:
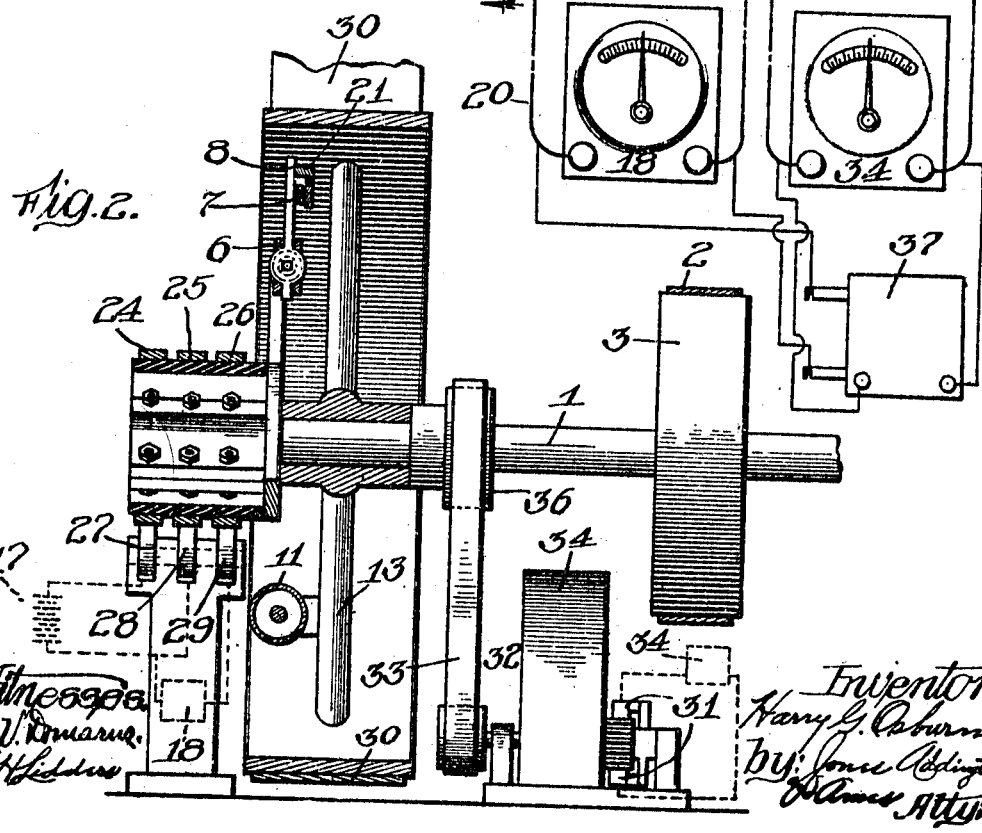

Referring to the accompanying drawings in which like reference characters refer to like parts throughout the several views; Figure 1 shows embodied in one form, the parts and arrangement thereof in an indicating-mechanism embodying my invention; Fig. 2 is an end view of the arrangement shown in Fig. 1, the pulley and parts carried thereby being shown in section taken on the dotted line 2 of Fig. 1.

A counter shaft 1 may be driven by a suitable motor (not shown) connected by a belt 2 to the driving pulley 3 on the counter shaft. The pulley 4 loosely mounted on the shaft 1 carries pivoted to one of its arms 5, a frame or member 6, having the resistance 7 mounted thereon over which the pointer 8 attached to the spring pressed link 9, which also is suitably carried by said member, is adapted to move. The spring pressed link 9 is pivotally connected to the driving arm 10, which latter is clamped fast at about its middle to the shaft 1, to turn therewith. The other end of the arm 10 may be pivotally connected to the dash pot 11, which is in turn pivoted as at 12 to the arm 13 of the pulley 4. As is easily seen, the spring pressed link 9, carried on the member 6 and pivoted to the arm 10 as hereinbefore mentioned, constitutes an elastic connection between said driving arm 10 and the pulley 4; and, with the driving arm moving in the direction indicated by the arrow, the pointer 8 will be moved over the resistance 7 on the member 6 from right to left in accordance with the tension in the spring of said spring-pressed link.

It will be understood that the movement of the pointer 8 may be indicated in any suitable manner, as for instance, by causing the pointer to move over a scale 14, shown on the member 6.

Arrangements such as those just referred to are attended with obvious disadvantages and a reading cannot be had at any instant at a distance from the driving member, nor in the second instance cited without slowing down or stopping the machinery for the purpose of taking such reading.

In order to overcome the disadvantages mentioned I provide means for electrically connecting the resistance 7 and pointer 8 with a suitable indicating device. The circuit arrangement for this purpose and the devices associated therewith may be as follows: The collar 23 suitably secured in position to the driving arm 10 has the collector rings 24, 25 and 26, mounted thereupon in contact with the brushes 27, 28 and 29, respectively. One pole of a suitable source 17 of E. M. F., is electrically connected through the brush 27, ring 24, and conductor 15, to one end of the resistance 7, and a conductor 16 connected to the other end of the resistance 7 is electrically connected through the ring 25 and brush 28 to the other pole of the source of E. M. F. A suitable indicating device 18 has one of its terminals electrically connected through the brush 29, ring 26, and conductor 19, to the pointer 8, while the other terminal is suitably connected to the brush 28. The conductor 19 is shown connected to the contact bar 21 over which the pointer moves in changing its position and which is secured to the insulating blocks 22 on the member 6; but it will be understood that it may be connected directly to the pointer by a suitable flexible extension.

When the driving shaft 1 is at rest, the pointer 8 is at the extreme of its movement to the right and all of the resistance 7 is interposed in circuit; and when said shaft and thereby the driving arm 10 are being driven, a pull is exerted by the spring-pressed link 9 on the member 6, whereby the pulley 4 is driven by said arm. Assuming the belt 30 on the pulley 4 to be connected to drive a machine then, with my arrangement, it is possible to obtain from the indicating device 18, the force transmitted by the pulley 4 to the belt or the pull exerted on the latter; this for the reason that the current through the device varies as the pointer changes position on the resistance 7 and the movement of the pointer is dependent on the pull exerted by the spring pressed link in driving the pulley 4. An ammeter, or if desired, a volt meter may be used as the indicating device, and may be calibrated to give directly in any desired units the pull on the belt or the force transmitted by the pulley 4. The speed of the rim of the pulley and thereby the speed of the belt may be obtained, either directly or by multiplying by a constant, by the use of the volt meter 34 which is calibrated to indicate the desired units, and connected to the brushes 31 of the constant field generator 32 which latter is driven by a belt 33 suitably connected to the pulley 4. As shown, the constant field for the generator 32 is obtainable by the use of a permanent magnet 34 having the pole pieces 35 attached thereto and the generator is driven by a supplementary pulley 36 secured to the pulley 4.

As is well known the product of the speed and force factors thus obtained at any instant, will give the power transmitted by the pulley 4 at such instant. To obtain directly the power thus transmitted by the pulley I employ the watt meter 37 and connect the high resistance coil thereof to the brushes at the generator 32, its low resistance coil being connected in the circuit described for the indicating device 18. The watt meter is provided with scales of desired units and calibrated to give directly the power at any instant or to indicate values from which the power may be obtained by computation. It will be understood that a properly calibrated recording watt meter may be used in lieu of the watt meter described in the above relation to indicate the power at any instant at any distance from the driving member and which will record the power transmitted during any length of time.

While I have shown my invention applied in connection with a pulley for driving a machine, it is obvious that it may be used in many other relations. For instance, it may be used to indicate in the cab of a locomotive the pull at any instant exerted by the locomotive on a train of cars, and the speed of travel of the same. Also the power expended at any instant in such case may be indicated or the power expended during any length of time may be recorded, therefore, in the appended claims I aim to cover any application which embodies the spirit of my invention.

Having thus described my invention what I claim as new and desire to secure by Letters Patent is:

1. In combination, a shaft, a member loosely mounted thereon, an arm rigidly secured to the said shaft, a link pivoted to said arm, a resilient connection between said link and member, and means controlled by said connection for indicating at a distance the force or power transmitted between said shaft and member at any instant.

2. In combination, a shaft, a member loosely mounted thereon, an arm rigidly secured to said shaft, a link pivoted to said arm, a frame carried by said member, a resilient connection between said link and frame, and means controlled by said connection for indicating at a distance the force or power transmitted between said shaft and member at any instant.

3. In combination, a shaft, a member loosely mounted thereon, an arm rigidly secured to said shaft, a resistance in circuit with a source of E. M. F., a link pivoted to said arm, a conducting element carried by said link and movable over the surface of said resistance, means for effecting relative movement between said resistance and element to vary such resistance proportionately to the force or power transmitted between said shaft and member, and means electrically associated with said source of E. M. F. for indicating at a distance the force or power transmitted between said shaft and member at any instant.

4. In combination, a shaft, a member loosely mounted thereon, an arm rigidly secured to said shaft, a resistance carried by said member and in circuit with a source of E. M. F., a link pivoted to said arm, a conducting element carried by said link and movable over the surface of said resistance, means for effecting relative movement between said resistance and element to vary such resistance proportionately to the force or power transmitted between said shaft and member, and means electrically associated with said source of E. M. F. for indicating at a distance the force or power transmitted between said shaft and member at any instant.

In witness whereof, I have hereunto subscribed my name in the presence of two witnesses.

HARRY G. OSBURN.

Witnesses:
J. C. OSBURN,
VICTORIA M. MOYSES.